(12) United States Patent
Venkataraman et al.

(10) Patent No.: US 10,986,491 B2
(45) Date of Patent: Apr. 20, 2021

(54) DEVICE, SYSTEM, AND METHOD FOR ADAPTIVE DATA COLLECTION OPERATIONS

(71) Applicant: Apple Inc., Cupertino, CA (US)

(72) Inventors: Vijay Venkataraman, San Jose, CA (US); Srinivasan Nimmala, San Jose, CA (US); An Chan, San Jose, CA (US); Zhiwei Wang, Beijing (CN); Srirang A. Lovlekar, Cupertino, CA (US); Srinivas Burugupalli, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/603,411

(22) PCT Filed: Apr. 7, 2017

(86) PCT No.: PCT/CN2017/079645
§ 371 (c)(1),
(2) Date: Oct. 7, 2019

(87) PCT Pub. No.: WO2018/184180
PCT Pub. Date: Oct. 11, 2018

(65) Prior Publication Data
US 2020/0037150 A1 Jan. 30, 2020

(51) Int. Cl.
*H04W 8/24* (2009.01)
*H04W 76/10* (2018.01)
(Continued)

(52) U.S. Cl.
CPC ............... *H04W 8/24* (2013.01); *H04W 8/08* (2013.01); *H04W 76/10* (2018.02); *H04W 88/06* (2013.01)

(58) Field of Classification Search
CPC ......... H04W 8/24; H04W 8/08; H04W 88/06; H04W 76/10; H04W 8/22; H04W 8/005; H04W 48/16; H04W 4/50; H04W 52/383; H04W 92/16; H04W 92/18; H04W 88/02; H04W 88/08; H04W 84/18; H04W 84/20; H04W 84/22; H04W 36/03; H04W 76/11; H04W 76/14; H04W 76/15; H04W 76/23;
(Continued)

(56) References Cited

U.S. PATENT DOCUMENTS 5,903,618 A * 5/1999 Miyake et al. ............... 375/356
2004/0190468 A1 * 9/2004 Saijonnnaa ................... 370/312
(Continued)

FOREIGN PATENT DOCUMENTS

| CN | 104105155 | 10/2014 |
| EP | 3032856 | 6/2016 |
| WO | 2015-143647 | 10/2015 |

*Primary Examiner* — Meless N Zewdu
(74) *Attorney, Agent, or Firm* — Fay Kaplun & Marcin, LLP (57) ABSTRACT

Method and apparatus for adaptive data collection operations where a first user equipment (UE) is paired to a second UE. The first UE may receive capability data from the second UE, the capability data comprising cellular capabilities of the second UE. The first UE may further collect service history data for the second UE, where the service history data corresponds to the cellular capabilities indicated by the capability data. The first UE may further transmit the service history data to the second UE.

18 Claims, 4 Drawing Sheets

(51) Int. Cl.
*H04W 8/08* (2009.01)
*H04W 88/06* (2009.01)
(58) Field of Classification Search
CPC ..... H04W 76/25; H04W 76/27; H04W 76/30; H04W 76/34; H04W 88/04; H04W 88/10; H04W 88/00; H04W 12/003; H04W 12/00305; H04W 28/0875; H04W 28/08; H04W 76/00
See application file for complete search history.

(56) References Cited

U.S. PATENT DOCUMENTS

| | | | |
|---|---|---|---|
| 2006/0168343 A1* | 7/2006 | Ma et al. | 709/245 |
| 2012/0282922 A1* | 11/2012 | Fodor et al. | 455/456.1 |
| 2016/0050698 A1 | 2/2016 | Siomina | |
| 2016/0338121 A1 | 11/2016 | Wietfeldt et al. | |
| 2017/0127473 A1* | 5/2017 | Virtej et al. | H04W 76/068 |
| 2020/0015297 A1* | 1/2020 | Feng | H04W 76/14 |

* cited by examiner

Method
400

Fig. 4

DEVICE, SYSTEM, AND METHOD FOR ADAPTIVE DATA COLLECTION OPERATIONS

BACKGROUND INFORMATION

A user may own various user equipments ("UE"), each capable of a wide range of functions. Each of the UEs may be compatible and able to communicate with each other by forming pairing connections. For example, a first UE, such as the user's smartphone device, may pair with a second UE, such as the user's wearable device (e.g., smartwatch device). During the pairing, the first UE and the second UE may exchange data to improve performance of one or both UEs.

Each UE may also be configured with different capabilities. For example, each UE may be configured to establish a connection with different types of networks through the use of wireless communications protocols. Based upon the capabilities of the hardware and software of the individual UE, the connection may be made with these different types of networks. The network, for instance, may be a Universal Mobile Telecommunication System ("UMTS"), a Long Term Evolution ("LTE") network, a Global System for Mobile Communications ("GSM"), a Code Division Multiple Access ("CDMA") network, etc.

The capabilities of the individual UEs may differ. For example, a first UE may have any of a better cell coverage, longer battery life, configurations to establish a connection to more of the different types of networks, ability to communicate on a broader range of frequency bands, roaming capabilities, etc. As such, it would be advantageous for the first UE to perform certain functions and exchange data collected from those functions with the second UE.

SUMMARY

The present application discloses a device, system and apparatus for adaptive data collection operations. In a first aspect, a method is disclosed where a first user equipment (UE) is paired to a second UE. The first UE may receive capability data from the second UE, the capability data comprising cellular capabilities of the second UE. The first UE may further collect service history data for the second UE, where the service history data corresponds to the cellular capabilities indicated by the capability data. The first UE may further transmit the service history data to the second UE.

In a second aspect, a method is disclosed where a first UE is paired to a second UE. The first UE may transmit capability data to the second UE, where the capability data comprises cellular capabilities of the first UE. The first UE may further receive service history data from the second UE, where the service history data comprises service history data for the first UE corresponding to the cellular capabilities indicated by the capability data of the first UE.

In a third aspect, a UE is disclosed. The UE may have a first transceiver configured to enable the UE to establish a pairing with a further UE, a second transceiver configured to enable the UE to establish a connection to a cellular network, and a processor configured to control operation of the first and second transceivers. The operation may receive capability data from the further UE, where the capability data comprises cellular capabilities of the second UE. The operation may further collect service history data for the further UE, where the service history data corresponds to the cellular capabilities indicated by the capability data. The operation may further transmit the service history data to the further UE.

In a fourth aspect, a UE is disclosed. The UE may have a first transceiver configured to enable the UE to establish a pairing with a further UE, a second transceiver configured to enable the UE to establish a connection to a cellular network, and a processor configured to control operation of the first and second transceivers. The operation may transmit capability data to the further UE, where the capability data comprises cellular capabilities of the UE. The operation may further receive service history data from the further UE, where the service history data comprises service history data for the UE corresponding to the cellular capabilities indicated by the capability data of the UE.

DETAILED DESCRIPTION

The exemplary embodiments may be further understood with reference to the following description and the related appended drawings, wherein like elements are provided with the same reference numerals. The exemplary embodiments are related to a device, system, and method for adaptive data collection operations and search history pruning operations.

Initially, it is noted that the exemplary embodiments are described with regard to a first user equipment ("UE"), which will be described as a "companion UE", and a second UE, which will be described as an "accessory UE". In the exemplary embodiments below, the accessory UE may be discussed as having fewer functionalities than the companion UE. For example, in an exemplary embodiment where the companion UE is a smartphone and the accessory UE is a wearable (e.g., smartwatch), the accessory UE may have a shorter battery life, a smaller memory, and/or fewer wireless capabilities. However, it should be noted that such an embodiment is only exemplary. The companion UE and the accessory UE may have the same functionalities, the companion UE may have fewer functionalities than the accessory UE, or each of the companion UE and the accessory UE may have different functionalities that the other does not have. It should also be noted that the companion UE and the accessory UE may be any electronic device, including similar electronic devices, such as both the companion UE and the accessory UE being smartphones, tablets, wearables, etc.

As will be discussed in more detail below, the companion UE and the accessory UE may be paired to each other through pairing functionalities. In an exemplary embodiment, the pairing may be via a wireless connection, such as a Bluetooth connection. However, those skilled in the art would understand that other wireless and wired methods also may be used to pair the accessory UE and the companion UE, including but not limited to a WiFi connection or a corded connection.

During the pairing, the accessory UE may cease cellular activity with a network through a base station and conduct cellular activity with the network through the pairing connection with the companion UE (e.g., the companion UE conducts all data transfers unto the base station). It should be understood that the pairing intends to minimize a power impact by facilitating communication between the companion UE and the accessory UE and aims to save power for the accessory UE by having the companion UE perform certain functions for the accessory UE. For example, the companion UE may collect camped cell information, Public Land Mobile Networks (PLMN) information, and a camped frequencies history as well as System Information of the camped cells of the companion UE for the accessory UE. The companion UE may then transmit the collected data to the accessory UE. This will not only prevent draining of the battery of the accessory UE by alleviating the need for the accessory UE to collect the data itself, but will also allow the accessory UE to camp on a cell quickly if it loses pairing with the companion UE. That is, once the accessory UE loses its pairing with the companion UE, the accessory UE may reconnect to the network via the base station and quickly camp on a cell due to the data received from the companion UE.

Since the accessory UE and the companion UE are paired and exchanging data, it is preferable to filter out data that is irrelevant to the accessory UE. This saves on the amount of data transmitted to the accessory UE, thereby saving the resources of both UEs. Additionally, if a user does not possess an accessory UE or the user's accessory UE does not have cellular capabilities, then it is preferable for the companion UE to not waste resources collecting data that will never be used by an accessory UE. As such, the exemplary embodiments provide methods for the above discussed preferences.

It is further noted that the exemplary embodiments may describe cellular capabilities of the accessory UE and the companion UE. The cellular capabilities of the accessory UE and the companion UE may vary. These cellular capabilities may include the ability to connect to different types of networks. For instance, the network may be a Universal Mobile Telecommunication System ("UMTS"), a Long Term Evolution ("LTE") network, a Global System for Mobile Communications ("GSM") network, a Code Division Multiple Access ("CDMA") network, etc. As an example pertaining to the varying cellular capabilities of the accessory UE and the companion UE, the companion UE may support LTE and CDMA while the accessory UE may only support LTE. The cellular capabilities may further include which aspects of a network the UE is compatible with. For example, the companion UE may be compatible with a first set of LTE frequency bands while the accessory UE may be compatible with a second set of LTE frequency bands, which are only a subset of the first set of LTE frequency bands. Another example may be that the Companion UE may support Roaming capability, while the accessory UE may not support Roaming Capability. Those skilled in the art would understand that the above exemplary embodiments are merely for illustrative purposes and the accessory UE and the companion UE may use any combination or all possible cellular capabilities. Thus, the exemplary embodiments provide a method for collecting and transmitting relevant data from the companion UE to the accessory UE. It should also be noted that communication of the any data between the companion UE and the accessory UE can be reciprocal.

Figure 1:
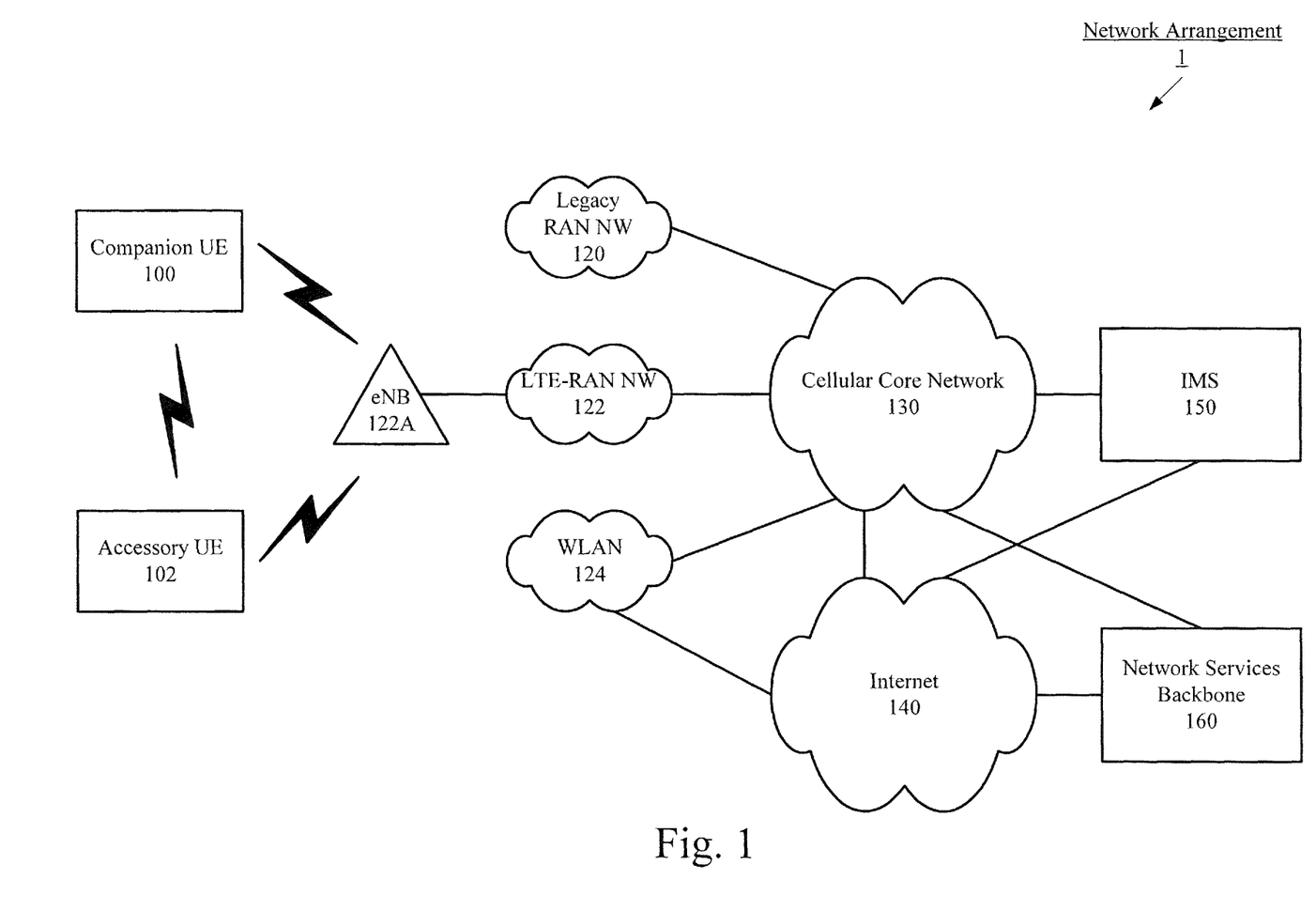
FIG. 1 shows a network arrangement according to various exemplary embodiments described herein.

FIG. 1 shows a network arrangement 1 according to the exemplary embodiments. The network arrangement 1 includes a companion UE 100 and an accessory UE 102. As discussed above, the UEs 100-102 may be any type of electronic component that is configured to communicate via a wireless network, e.g., mobile phones, wearables, tablet computers, desktop computers, smartphones, phablets, embedded devices, etc. It should also be understood that an actual network arrangement may include any number of UEs being used by any number of users. Further, any number of these UEs may be paired with each other and associated to any number of users. That is, the example of two (2) UEs 100-102 is only provided for illustrative purposes.

The companion UE 100 and the accessory UE 102 may be configured to communicate directly with one or more networks or with each other. In this example, the networks with which the companion UE 100 and the accessory UE 102 may communicate are a legacy radio access network (RAN) 120, a Long Term Evolution (LTE-RAN) 122, and a wireless local area network (WLAN) 124. Each of the networks 120-124 is a wireless network with which the companion UE 100 and the accessory UE 102 may communicate wirelessly. However, it should be understood that the companion UE 100 and the accessory UE 102 may also communicate with other types of networks and may also communicate using a wired connection. With regards to the exemplary embodiments, the companion UE 100 and the accessory UE 102 may establish a connection with the LTE-RAN 122 to, among other functionalities, perform calls and exchange data with other devices connected to the network. For example, the companion UE 100 and the accessory UE 102 may have a LTE chipset and communicate with the LTE-RAN 122. As those skilled in the art will understand, the exchange of data in performing operations associated with the LTE-RAN 122 may utilize control information from the LTE-RAN 122. Thus, the companion UE 100 and the accessory UE 102 may receive the control information from the LTE-RAN 122 to coordinate the data exchange.

The legacy RAN 120 and the LTE-RAN 122 are portions of cellular networks that may be deployed by cellular providers (e.g., Verizon, AT&T, Sprint, T-Mobile, etc.). These networks 120 and 122 may also include, for example, base client stations (Node Bs, eNodeBs, HeNBs, etc.) that are configured to send and receive data from the UEs that are equipped with the appropriate cellular chip set including the control information. As noted above, the exemplary embodiments are described with regards to the LTE-RAN 122 but may be modified for use with the legacy RAN 120. The WLAN 124 may include any type of wireless local area network (WiFi, Hot Spot, IEEE 802.11x networks, etc.). The exemplary embodiments may also be utilized with the WLAN 124.

In addition to the networks 120-124, the network arrangement 1 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the companion UE 100 and the accessory UE 102 using the IP protocol. The IMS 150 may communicate with the cellular core network 130 and the Internet 140 to provide the multimedia services to the companion UE 100 and the accessory UE 102. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the companion UE 100 and the accessory UE 102 in communication with the various networks. The network services backbone 160 may interact with the companion UE 100 and the accessory UE 102 and/or the networks 120, 122, 124, 130, 140 to provide these extended functionalities.

The exemplary embodiments relate to the companion UE 100 and the accessory UE 102 connecting to the LTE-RAN 122 via the evolved Node B (eNB) 122A. The eNB 122A may be configured to exchange data with the companion UE 100 and the accessory UE 102 through scheduled data transmissions defined using control information. For example, the control information may be provided using a PDCCH and/or a PDSCH transmission at predefined times when the companion UE 100 and the accessory UE 102 are configured to receive data. Initially, the companion UE 100 and the accessory UE 102 may establish a connection to the LTE-RAN 122. Those skilled in the art will understand that any association procedure may be performed for the companion UE 100 and the accessory UE 102 to connect to the LTE-RAN 122. For example, as discussed above, the LTE-RAN 122 may be associated with a particular cellular provider where the companion UE 100 and the accessory UE 102 and/or the user thereof has a contract and credential information (e.g., stored on a SIM card). Upon detecting the presence of the LTE-RAN 122, the companion UE 100 and the accessory UE 102 may transmit the corresponding credential information to associate with the LTE-RAN 122. More specifically, the companion UE 100 and the accessory UE 102 may associate with a specific access point (e.g., the eNB 122A of the LTE-RAN 122).

Those skilled in the art will understand that the control information may enable a synchronization of the companion UE 100 and the accessory UE 102 with the eNB 222A. To properly be prepared for demodulating signals received from the eNB 122A and/or transmitting signals or data to the eNB 122A, the UEs 100 and 102 must be configured with proper settings. Specifically, properties related to the physical layer of the transceiver used to connect to the LTE-RAN 122 must be known. For example, the channel (e.g., band of frequencies) must be known for the incoming signal in order for it to be properly received.

In exemplary embodiments, while the companion UE 100 is paired to the accessory UE 102, the accessory UE 102 may cease direct wireless communication with the eNB 122A. Specifically, the accessory UE 102 may communicate with the eNB 122A through the companion UE 100, via the pairing connection. It should be noted that, alternatively, the companion UE 100 may cease direct communication with the eNB 122A and communicate with the eNB 122A through the accessory UE 102. In the event that the pairing connection between the companion UE 100 and the accessory UE 102 is broken (e.g., disconnection) the piggybacking UE may reconnect directly to the eNB 122A.

Figure 2:
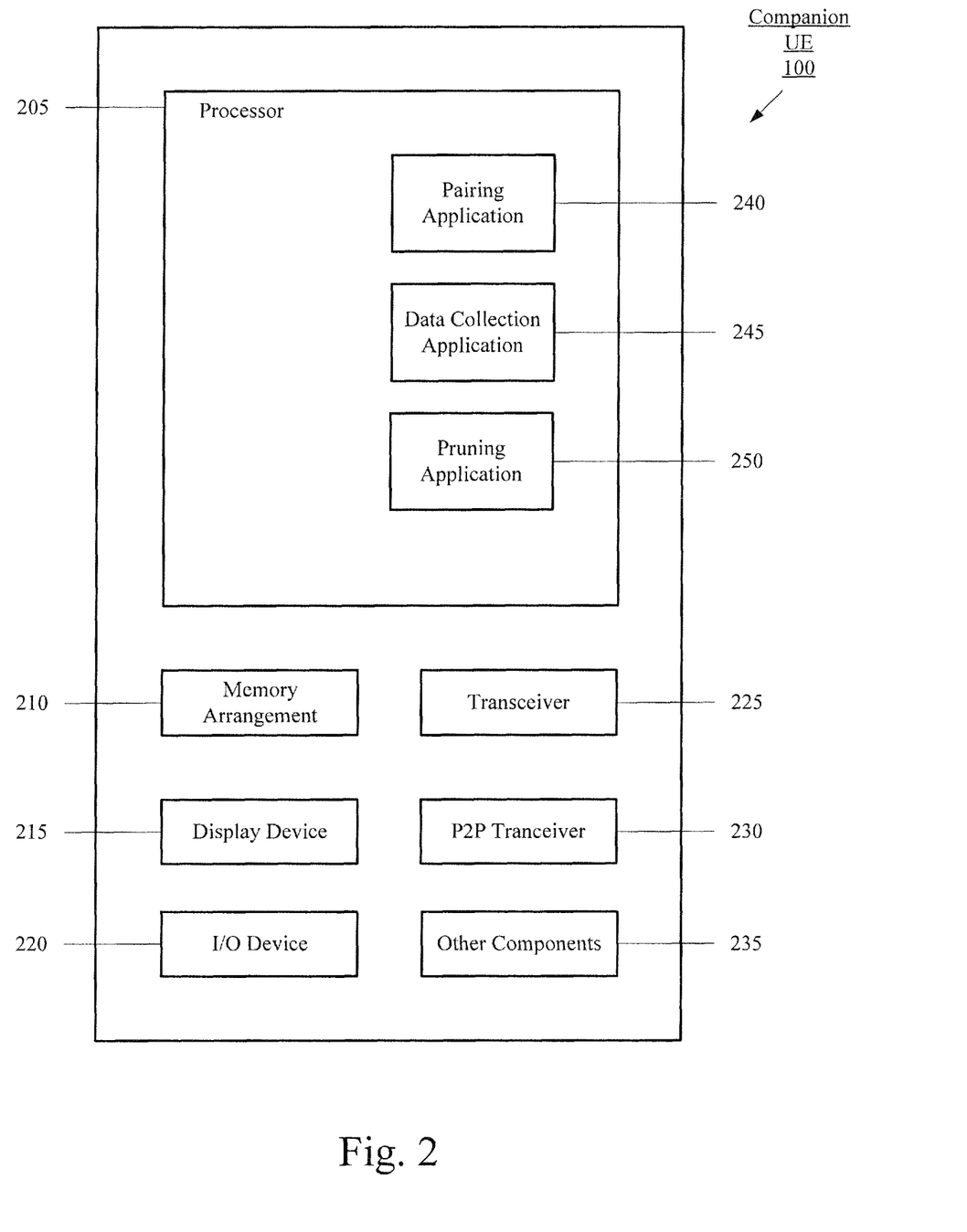
FIG. 2 shows a user equipment according to various exemplary embodiments described herein.

FIG. 2 shows the companion UE 100, according to the exemplary embodiments. It should be noted that the accessory UE 102 may have the same components as the companion UE 100, or have different components and/or applications. As such, while FIG. 2 will primarily discuss the functionalities of the companion UE 100, those skilled in the art would understand that all references to the companion UE 100 may also apply to the accessory UE 102. The companion UE 100 is configured to execute a plurality of applications that perform functionalities to perform adaptive data collection operations and service history pruning operations. These operations will be discussed below.

The companion UE 100 may represent any electronic device that is configured to perform wireless functionalities. For example, the companion UE 100 may be a portable device such as a smartphone, a wearable, a tablet, a phablet, a laptop, etc. In another example, the companion UE 100 may be a client stationary device such as a desktop terminal. The companion UE 100 may be configured to perform cellular, WiFi and/or pairing functionalities. The companion UE 100 may include a processor 205, a memory arrangement 210, a display device 215, an input/output (I/O) device 220, a transceiver 225, such as an LTE radio, WLAN radio, etc., a P2P transceiver 230, such as a Bluetooth transceiver and other components 235. The other components 235 may include, for example, an audio input device, an audio output device, a battery that provides a limited power supply, a data acquisition device, ports to electrically connect the companion UE 100 to other electronic devices, etc.

The processor 205 may be configured to execute a plurality of applications of the companion UE 100. For example, the applications may include a pairing application 240 that enables the companion UE 100 to perform a pairing functionality. As noted above, the pairing functionality may, for example, pair the accessory UE 102 with the companion UE via a Bluetooth connection, a WiFi connection, a cellular connection, any other wireless connection or a wired connection. In another example, the processor 205 may execute a data collection application 245. As will be described in further detail below, the data collection application 245 may determines to initiate data collection. In a further example, the processor 205 may execute a pruning application 250. As will be described in further detail below, the pruning application 250 may be configured to prune a service history of the companion UE 100.

It should be noted that the above noted applications each being an application (e.g., a program) executed by the processor 205 is only exemplary. The functionality associated with the applications may also be represented as a separate incorporated component of the companion UE 100 or may be a modular component coupled to the companion UE 100, e.g., an integrated circuit with or without firmware. For example, the integrated circuit may include input circuitry to receive signals and processing circuitry to process the signals and other information. In addition, in some UEs, the functionality described for the processor 205 is split among two processors, a baseband processor and an applications processor. The exemplary embodiments may be implemented in any of these or other configurations of a UE.

The memory 210 may be a hardware component configured to store data related to operations performed by the companion UE 100. As will be described in further detail below, the memory 210 may store a standard database or a customized database. The display device 215 may be a hardware component configured to show data to a user while the I/O device 220 may be a hardware component that enables the user to enter inputs. It should be noted that the display device 215 and the I/O device 220 may be separate components or integrated together such as a touchscreen.

The transceiver 225 may be a hardware component configured to exchange data with base client stations (Node Bs, eNodeBs, HeNBs, etc.) that are configured to send and receive traffic from UEs that are equipped with the appropriate cellular chip set including the control information. An exemplary example of the base client station may be eNB 122A, seen in FIG. 1. The transceiver 225 may enable communication with the network, such as LTE-RAN 122, seen in FIG. 1, or with other electronic devices directly or indirectly through the LTE-RAN 122 to which the companion UE 100 is connected. The transceiver 225 may operate on a variety of different frequencies or channels (e.g., set of consecutive frequencies). Thus, an antenna (not shown) coupled with the transceiver 225 may enable the transceiver 225 to operate on the LTE frequency band. The transceiver 225 may further exchange data with other UEs through the pairing connection via Bluetooth, WiFi or a wired connection.

Figure 3:
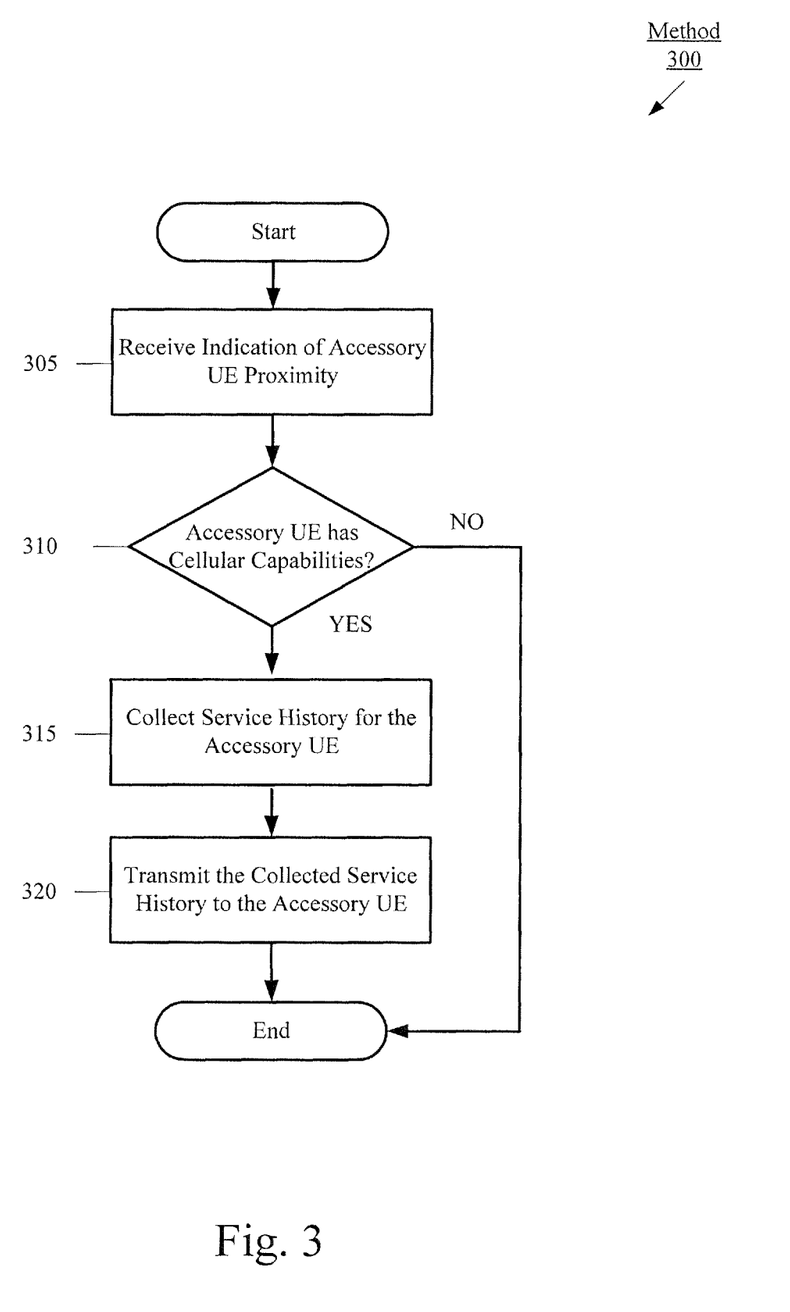
FIG. 3 shows a method for adaptive data collection operations according to various exemplary embodiments described herein.
Figure 4:
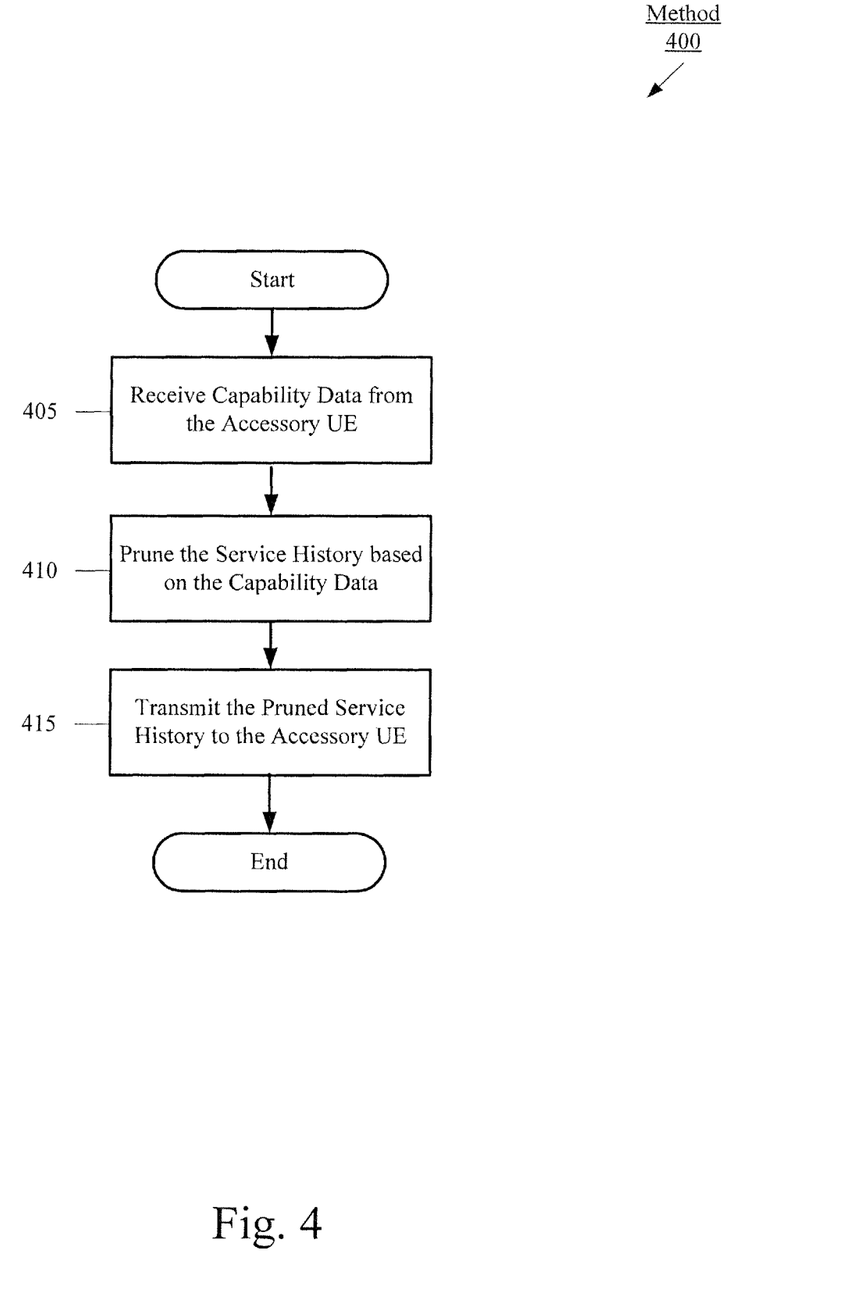
FIG. 4 shows a method for service history pruning operations according to various exemplary embodiments described herein.

FIGS. 3 and 4 below will pertain to methods of adaptive data collection. In particular, FIG. 3 will discuss exemplary embodiments of determining when to begin adaptive data collection operations. FIG. 4 will discuss exemplary embodiments of the type of data that is to be collected in the event that the adaptive data collection operations of FIG. 3 are initiated.

FIG. 3 shows a method 300 for adaptive data collection operations according to the exemplary embodiments. The method 300 relates to how the companion UE 100 determines to initiate data collection. The method 300 will be described with regard to the companion UE 100, the accessory UE 102 (which are embodiments of the companion UE 100 of FIG. 2) and the network arrangement 1 of FIG. 1. Further, the adaptive data collection operations may be performed by the data collection application 245.

In 305, the companion UE 110 receives an indication of the accessory UE 102 being within a proximity of the companion UE 110. In an exemplary embodiment, the proximity may be determined when the pairing between the companion UE 100 and the accessory UE 102 is initiated or complete. The pairing may be conducted by the pairing application 240 utilizing the P2P transceiver 230. As discussed above, the pairing may be a Bluetooth pairing, a WiFi pairing, an internet pairing, a wired connection, etc. In another exemplary embodiment, the proximity may be a registration of the accessory UE 102 to a user account. The user account may, for example, be a cloud account, an email account, a network account, a user name, or any other account associated with the user.

In 310, the companion UE 100 determines whether the accessory UE 102 has cellular capabilities. In an exemplary embodiment, the companion UE 100 may determine whether the accessory UE 102 has cellular capabilities by checking the make and or model number of the accessory UE 102 against a database stored locally or in the network arrangement 1. In a further exemplary embodiment, the companion UE 100 may receive an indication from the accessory UE 102 that informs the companion UE 100 whether the accessory UE 102 has cellular capabilities. The companion UE 100 may request the indication or the indication may be transmitted independently without a request.

If it is determined in 310 that the accessory UE 102 has no cellular capabilities, the method 300 ends. This means the companion UE 100 does not need to collect any service history data for the accessory UE 102 because the accessory UE 102 does not have cellular capability and the collecting of the service history data for the accessory UE 102 is not needed. Thus, the resources of the companion UE 100 are not wasted collecting a service history that will never be used. If it is determined in 310 that the accessory UE 102 has cellular capabilities, the method 300 moves on to 315. It should also be noted that in certain scenarios where the user does not have an accessory UE 102, the companion UE 100 may never receive the indication of the accessory UE 102 being within the proximity of the companion UE 100. In such scenarios, the companion UE 100 will also not begin collecting the service history data.

In 315, when it is determined that the accessory UE 102 has cellular capabilities, the companion UE 100 begins collecting a service history for the accessory UE 102. It should be understood that the service history may be the same or different from the service history the companion UE 100 collects for itself. Further, it should be noted that any reference to service history below will be in regards to the service history for the accessory UE 102. However, those skilled in the art would understand that the service history collected for the accessory UE 102 and the service history collected for the companion UE 100 may be the same service history or a different service history.

In an exemplary embodiment, the service history may be cell specific. For example, the service history may include information regarding the cells the companion UE 100 camped on, the frequency bands used from the camped cells, the System Information for the camped cells, the networks the companion UE 100 registered with, and any other relevant data. In an exemplary embodiment, the companion UE 100 may use database(s) in the memory arrangement 210 to store the service history. For example, the memory arrangement 210 may have a camped on cells database, a frequency bands database, etc. In another exemplary embodiment, the companion UE 100 may create a new database(s) in the memory arrangement 210 for the data.

In an exemplary embodiment, the companion UE 100 may collect and store the service history indefinitely. For example, if the accessory UE 102 unpairs with the companion UE 100, due to a user selection, a reboot of either the companion UE 100 or the accessory UE 102, an interference of the pairing connection, a loss of the pairing connection, or any other reason, the companion UE 100 may continue to collect and store the service history while unpaired with the accessory UE 102. A duration of the collection and/or storage may be indefinite or based on a predetermined amount of time or an input by the user or the network. Those skilled in the art would understand that the predetermined amount of time may be reset upon a re-pairing of the companion UE 100 and the accessory UE 102.

Alternatively, in the event of an unpairing between the companion UE 100 and the accessory UE 102, the companion UE 100 may freeze collecting the service history for the accessory UE 102 but keep the already created databases for the duration. When the companion UE 100 re-pairs with the accessory UE 102, the companion UE 100 may again begin collecting the service history for the accessory UE 102. In 320, the companion UE 100 may transmit the service history to the accessory UE 102 via the transceiver 225.

FIG. 4 shows a method 400 for service history pruning operations according to the exemplary embodiments. The method 400 relates the companion UE 100 pruning the service history collected for the accessory UE 102. The method 400 will be described from the perspective of the companion UE 100 and with regard to the companion UE 100, the accessory UE 102 (which are embodiments of the companion UE 100 of FIG. 2) and the network arrangement 1 of FIG. 1. Further, the service history pruning operations may be performed by the pruning application 250.

In 405, the companion UE 100 receives capability data from the accessory UE 102 via the transceiver 225. In an exemplary embodiment, the capability data may be data indicating to the companion UE 100 which capabilities the accessory UE 102 possesses. In a first example, the capabilities may include which cellular radios the accessory UE 102 supports. As discussed above, the cellular radios may be LTE, UMTS, CDMA, GSM, etc. In a second example, the capability data may include which frequency bands and/or channels of the cellular radios the accessory UE 102 supports. For example, the capability data may include which frequency bands of the LTE network are supported by the accessory UE 102. In a third example, the capability data may include the roaming capabilities of the accessory UE 102 and whether the accessory UE 102 supports roaming functions. In a fourth example, the capability data may include carrier aggregation capabilities of the accessory UE 102 and whether the accessory UE 102 supports carrier aggregation functions. Those skilled in the art will understand that any combination of the above-described examples may be included in the capability data.

In an exemplary embodiment, the accessory UE 102 may transmit the capability data when it pairs with the companion UE 100. For example, once the Bluetooth connection is established, the accessory UE 102 may transmit the capability data to the companion UE 100. In another exemplary embodiment, the accessory UE 102 may transmit the capability data to the companion UE 100 when requested to do so by the companion UE 100. For example, when the companion UE 100 is paired with the accessory UE 102, the companion UE 100 may transmit a request for the capability data to the accessory UE 102. The companion UE 100 may request the capability data due to a change in its own capability, the expiration of a timer, a reboot of its internal software or hardware, a reconnection to the accessory UE 102, the user's request, or for any other reason.

In a further exemplary embodiment, the accessory UE 102 may retransmit the capability data whenever a predetermined event occurs. In a first example, the predetermined event may be a cellular provider change. For example, the accessory UE 102 may be connected to a first cellular provider from which the accessory UE 102 supports the LTE network and the CDMA network. When the accessory UE switches to a second cellular provider, the accessory UE 102 may only support the LTE network from the second cellular provider. The change in capabilities may be the predetermined event and trigger the accessory UE 102 to retransmit its updated capabilities to the companion UE 100. The companion UE 100 may store the received capability data on the memory 210.

In 410, the companion UE 100 prunes the service history based on the capability data. In an exemplary embodiment, the pruning may include collecting, for the accessory UE 102, the service history of only the capabilities indicated by the capability data. The collecting may employ the functions discussed in method 300. In a first example, if the capability data indicates that the accessory UE 102 does not support CDMA, then the companion UE 100 may prune the service history data by not collecting CDMA data for the accessory UE 102. In another example, if the capability data indicates that the accessory UE 102 does not support LTE frequency band 41, then the companion UE 100 may prune the service history data by not collecting data pertaining to LTE frequency band 41. Again, it should be understood that the companion data may still collect CDMA and LTE frequency band 41 data for other uses, including personal use.

The collecting may employ the functions discussed in method 300. Specifically, the companion UE 100 may collect information regarding which cells the companion UE 100 camped on, which frequency bands from the camped cells were used, which networks the companion UE 100 registered with, and any other relevant data, and store the collected data in the database(s).

In a final example, if the capability data indicates that the accessory UE 102 does not support roaming functions, when the companion UE 100 is in a roaming mode, it may not collect any service history for the accessory UE 102. This is because the cells used by the companion UE 100 while in roaming mode are not supported by the accessory UE.

In 415, the companion UE 100 transmits the pruned service history to the accessory UE 102 via the transceiver 225. In an exemplary embodiment, the transmission may be time specific. For example, the companion UE 100 may transmit the pruned service history to the accessory UE 102 every predetermined time frequency. In another exemplary embodiment, the companion UE 100 may transmit the pruned service history whenever requested by the accessory UE 102. In yet another exemplary embodiment, the companion UE 100 may transmit the pruned service history in response to a predetermined event, such as after a handover occurs.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method, comprising:
   at a first user equipment (UE) paired to a second UE:
   receiving capability data from the second UE, wherein the capability data comprises cellular capabilities of the second UE;
   collecting service history data for the second UE, wherein the service history data corresponds to the cellular capabilities indicated by the capability data;
   transmitting the service history data to the second UE:
   when a predetermined event occurs, receiving updated capability data from the second UE;
   collecting updated service history data for the second UE, wherein the updated service history data corresponds to the cellular capabilities indicated by the updated capability data; and
   transmitting the updated service history data to the second UE.

2. The method of claim 1, further comprising:
   prior to collecting the service history, determining whether the second UE is cellular capable.

3. The method of claim 2, wherein, when it is determined that the second UE is cellular capable, the first UE continues to collect service history data for the second UE when the first and second UE are no longer paired.

4. The method of claim 1, wherein the cellular capabilities comprise at least one of cellular technologies the second UE supports, frequency bands the second UE supports or whether the second UE supports roaming.

5. The method of claim 1, wherein the pairing comprises at least one of a Bluetooth connection or a WiFi connection between the first UE and the second UE.

6. The method of claim 1, wherein the first UE is a smartphone device and the second UE is a wearable.

7. The method of claim 1, wherein the predetermined event comprises at least one of a change in the cellular capabilities of the second UE, a reconnection of the pairing between the first UE and the second UE, or an expiration of a timer.

8. A method, comprising:
at a first user equipment (UE) paired to a second UE:
transmitting capability data to the second UE, wherein the capability data comprises cellular capabilities of the first UE; and
receiving service history data from the second UE, wherein the service history data comprises service history data for the first UE corresponding to the cellular capabilities indicated by the capability data of the first UE;
when a predetermined event occurs, transmitting updated capability data to the second UE; and
receiving updated service history data to from the second UE, wherein the updated service history data comprises updated service history data of the second UE corresponding to the cellular capability of the updated cellular capabilities indicated by the updated capability data.

9. The method of claim 8, wherein the cellular capabilities comprise at least one of cellular technologies the first UE supports, frequency bands the first UE supports or whether the first UE supports roaming.

10. The method of claim 8, wherein the pairing comprises at least one of a Bluetooth connection or a WiFi connection between the first UE and the second UE.

11. The method of claim 8, wherein the first UE is a wearable device and the second UE is a smartphone device.

12. The method of claim 8, wherein the predetermined event comprises at least one of a change in the cellular capabilities of the first UE, a reconnection of the pairing between the first UE and the second UE, or an expiration of a timer.

13. A user equipment (UE), comprising:
a first transceiver configured to enable the UE to establish a pairing with a further UE;
a second transceiver configured to enable the UE to establish a connection to a cellular network; and
a processor configured to control operation of the first and second transceivers by;
receiving capability data from the further UE, wherein the capability data comprises cellular capabilities of the second UE;
collecting service history data for the further UE, wherein the service history data corresponds to the cellular capabilities indicated by the capability data; and
transmitting the service history data to the further UE;
when a predetermined event occurs, receiving updated capability data from the second UE;
collecting updated service history data for the second UE, wherein the updated service history data corresponds to the cellular capabilities indicated by the updated capability data; and
transmitting the updated service history data to the second UE.

14. The UE of claim 13, further comprising the processor configured to:
prior to collecting the service history, determining whether the further UE is cellular capable.

15. The UE of claim 13, wherein the cellular capabilities comprise at least one of cellular technologies the further UE supports, frequency bands the further UE supports or whether the further UE supports roaming.

16. A user equipment (UE), comprising:
a first transceiver configured to enable the UE to establish a pairing with a further UE;
a second transceiver configured to enable the UE to establish a connection to a cellular network; and
a processor configured to control operation of the first and second transceivers by;
transmitting capability data to the further UE, wherein the capability data comprises cellular capabilities of the UE;
receiving service history data from the further UE, wherein the service history data comprises service history data for the UE corresponding to the cellular capabilities indicated by the capability data of the UE;
when a predetermined event occurs, transmitting updated capability data to the second UE; and
receiving updated service history data to from the second UE, wherein the updated service history data comprises updated service history data of the second UE corresponding to the cellular capability of the updated cellular capabilities indicated by the updated capability data.

17. The UE of claim 16, wherein the processor is further configured to:
when paired with the further UE, disconnect from the cellular network.

18. The UE of claim 17, wherein the processor is further configured to:
when unpaired from the further UE, reconnect to the cellular network based on the service history data provided by the further UE.

* * * * *

UNITED STATES PATENT AND TRADEMARK OFFICE
CERTIFICATE OF CORRECTION

PATENT NO.        : 10,986,491 B2
APPLICATION NO.   : 16/603411
DATED             : April 20, 2021
INVENTOR(S)       : Venkataraman et al.

Page 1 of 1

It is certified that error appears in the above-identified patent and that said Letters Patent is hereby corrected as shown below:

In the Claims

Claim 8, Column 11, Lines 23:
"receiving updated service history data to from the second" should read "receiving updated service history data from the second"

Claim 16, Column 12, Lines 37:
"receiving updated service history data to from the second" should read "receiving updated service history data from the second"

Signed and Sealed this
Twenty-second Day of June, 2021

Drew Hirshfeld
*Performing the Functions and Duties of the
Under Secretary of Commerce for Intellectual Property and
Director of the United States Patent and Trademark Office*